US008689274B2

(12) United States Patent
Li et al.

(10) Patent No.: US 8,689,274 B2
(45) Date of Patent: Apr. 1, 2014

(54) SET-TOP BOX-BASED TV STREAMING AND REDIRECTING

(75) Inventors: Jian Li, San Ramon, CA (US); Zhi Li, Martinez, CA (US); Sun-Uk Park, Union City, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 163 days.

(21) Appl. No.: 13/306,422

(22) Filed: Nov. 29, 2011

(65) Prior Publication Data

US 2012/0072962 A1 Mar. 22, 2012

Related U.S. Application Data

(63) Continuation of application No. 11/958,525, filed on Dec. 18, 2007, now Pat. No. 8,091,109.

(51) Int. Cl.
*H04N 7/16* (2011.01)

(52) U.S. Cl.
USPC ................ 725/141; 725/62; 725/94; 725/133

(58) Field of Classification Search
USPC .......... 725/62, 63, 93–96, 110, 133, 141, 153
See application file for complete search history.

(56) References Cited

U.S. PATENT DOCUMENTS

| 5,532,748 | A | 7/1996 | Naimpally |
| 6,118,498 | A | 9/2000 | Reitmeier |
| 6,344,882 | B1 | 2/2002 | Shim |
| 6,519,011 | B1 | 2/2003 | Shendar |
| 6,538,704 | B1 | 3/2003 | Grabb |
| 6,714,264 | B1 | 3/2004 | Kempisty |
| 6,804,824 | B1 | 10/2004 | Protebic |
| 7,707,614 | B2 | 4/2010 | Krikorian |
| 8,091,109 | B2 * | 1/2012 | Li et al. ........................ 725/94 |
| 2006/0123445 | A1 | 6/2006 | Sullivan |
| 2007/0044119 | A1 | 2/2007 | Sullivan |
| 2007/0211800 | A1 | 9/2007 | Shi |

OTHER PUBLICATIONS

Liu et al., "Video Redundancy—A Best-Effort Solution to Network Data Loss", Computer Science Department, Worcester Polytechnic Institute, p. 195, 1999.
Wong et al., "Redundant Array of Inexpensive Servers of On-Demand Multimedia Services", Advance Network Systems Laboratory, Department of Information Engineering, The Chinese University of Hong Kong, IEEE 1997, pp. 787-792.

* cited by examiner

*Primary Examiner* — Hunter B Lonsberry
(74) *Attorney, Agent, or Firm* — Guntin & Gust, PLC; Douglas Schnabel

(57) ABSTRACT

A method for redirecting video content includes receiving a video signal at the set-top box and decoding the video signal to produce unrendered video data. The unrendered video data is encoded and provided to the remote device via a wide area network. By encoding unrendered, rather than rendered, video data for transmission to the remote device, the need for an encoding device external to the set-top box is obviated.

17 Claims, 3 Drawing Sheets

SET-TOP BOX-BASED TV STREAMING AND REDIRECTING

CROSS-REFERENCE TO RELATED APPLICATIONS

This application is a continuation of U.S. patent application Ser. No. 11/958,525 filed Dec. 18, 2007, the disclosure of which is incorporated herein by reference in its entirety.

FIELD OF THE DISCLOSURE

The present disclosure generally relates to communications networks, and more particularly relates to providing video content via a communication network.

BACKGROUND OF THE DISCLOSURE

Video content is increasingly available through a variety of devices, including mobile devices. Conventionally, to obtain video content at a mobile device such as a cellular telephone the device accesses a web-based video source, such as a streaming video web site or repository of video content items. However, such web-based video sources typically do not provide the variety of content available via broadcast or multicast video sources, such as Internet Protocol Television. This limitation in the available video content can result in a poor experience for users of the mobile devices.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

A method and device for redirecting video content from a set-top box to a remote device is disclosed. The method includes receiving a video signal at the set-top box and decoding the video signal to produce unrendered video data. The unrendered video data is encoded and provided to the remote device via a wide area network. By encoding unrendered, rather than rendered, video data for transmission to the remote device, the need for an encoding device external to the set-top box is obviated.

Figure 1:
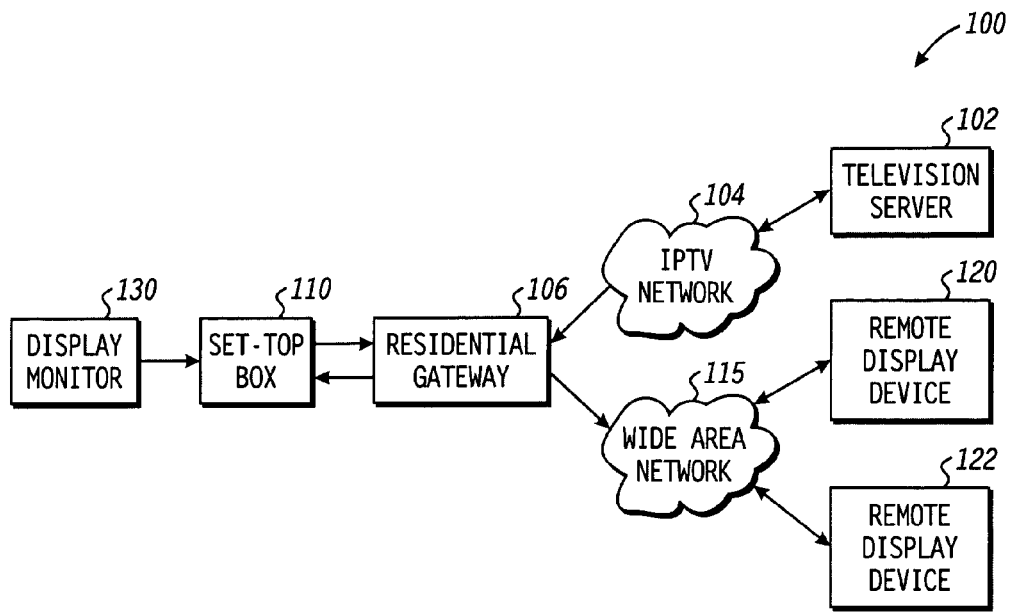
FIG. 1 is a block diagram illustrating a communication network in accordance with one embodiment of the present disclosure.

FIG. 1 illustrates a particular embodiment of a communications network 100 having a television server 102 and a residential gateway 106 connected via an IPTV network 104. The communications network 100 further includes a set-top box 110 connected to the residential gateway 106, and a display monitor 130 connected to the set-top box 110. Further, the residential gateway is connected to a wide area network 115, which is further connected to remote display devices 120 and 122.

The television server 102 stores television content for a service provider. The television content can include network and cable television programs, pay-per-view movies, streaming video content, or the like. The television server 102 multicasts the television content to customer premises via the IPTV network 104.

The IPTV network 104 provides a physical backbone and logical communication services for communications between the television server 102 and various customer premises. In an embodiment, the IPTV network 104 is a packet-switched network that routes data packets representing television content from the television server 102 to one or more customer premises.

The residential gateway 106 is located at a customer premises, and is an access point to the premises for the IPTV network 104. Accordingly, the residential gateway 106 receives television content from the IPTV network 104 and routes the content to an appropriate device at the customer premises. Further, the residential gateway 106 can receive requests for television content from devices at the customer premises, and provide those requests to the IPTV network 104. In addition, the residential gateway can provide content, including television content, from a customer premises device to the wide area network 115.

The set-top box 110 is a customer premise device that is configured to receive video content from the residential gateway 106, decode the content, and render the decoded content for display. Further the set-top box 110 is configured to receive requests for video content from the residential gateway 106, encode unrendered video data in response to the requests, and provide the encoded video data to the wide area network 115.

The display monitor 130 can be a television, monitor, or other device capable of displaying rendered video content. As used herein, rendered video content refers to video information that has been formatted for transfer to a display device, such as a television monitor, through a standard video connection such as a composite, HDMI, DVI, S-video, RCA, or other video connection. Accordingly, unrendered video content refers to decoded raw video data that has not been formatted for transfer and display at a display device via a standard video connection.

The wide area network 115 provides a physical backbone and logical layer for communications between remote display devices 120 and 122 and the residential gateway 106. In an embodiment, the wide area network 115 is a packet switched network including servers, routers, and other equipment to route packets based on address information included in each packet. In a particular embodiment, the wide area network 115 is the Internet. Further, it will be appreciated that although for purposes of discussion the IPTV network 104 and the wide area network 115 are illustrated as separate networks, the networks can share one or more elements in common, and could be the same network.

The remote display devices 120 and 122 are devices remote from the customer premises including the residential gateway 106, and are each capable of displaying video content. Accordingly, the remote display devices can each be a computer, mobile telephone, personal data assistant, or the like.

In operation, the set-top box 110 requests video content from the television server 102 via the IPTV network 104. In particular, a user provides the set-top box 110 with control information indicating a request for a particular video content item. The control information can be received via an infra-red (IR) or other signal from a remote control device, via a user interface at the set-top box, or the like. Further, the control information can be indicative of a channel change request, an order of a pay-per-view movie, selection of a particular video content item for streaming or download, or the like.

In response to receiving the control information, the set-top box 110 provides a request for the associated video content item to the residential gateway 106, which in turn routes the request to the television server 102. In response to the request, the television server 102 identifies the requested video content item and provides it in a series of packets to the residential gateway 106. The residential gateway 106 provides the packets to the set-top box 110. In an embodiment, the video content is provided via the packets in an encoded format that compresses the content, providing for faster transfer of the content via the IPTV network 104. For example, the video content can be provided in a Motion Picture Experts Group (MPEG) format. The set-top box 110 decodes the encoded content to produce unrendered video data, renders the video data, and provides the rendered video data to the display monitor 130 for display. The set-top box 110 can also store received video content for subsequent playback.

The set-top box 110 can also receive requests for video content from the wide area network 115. In particular, a user of one of the remote display devices 120 and 122 can enter a request for video content via a user interface. In an embodiment, the user interface can provide a list of available content via an electronic programming guide, searchable database, or the like. The display devices 120 and 122 provide the request to the residential gateway 106 via the wide area network 115. The residential gateway 106 routes the request to the set-top box 110 which, in response, identifies the video content item requested. The set-top box 110 then requests the identified video content item from the television server 102, which provides encoded video data associated with the requested item.

The set-top box 110 decodes the encoded video data to produce unrendered video data associated with the requested video content item. The set-top box 110 re-encodes the unrendered video data for transmission via the wide area network 115. In an embodiment, the set-top box 110 can change specified parameters of the re-encoding process, so that the re-encoded video data is different from the encoded video data originally received from the IPTV network 104. For example, the set-top box 110 can reencode the unrendered video data so that the video content has a different compression ratio, bit rate, or aspect ratio relative to the originally received video content. By changing these parameters, the set-top box 110 can provide the re-encoded video data in a format suitable for transmission and display at the requesting display device. Further, the set-top box 110 can be configured to identify the type of requesting remote display device (e.g. a cellular telephone), and set the compression ratio, bit rate, and other parameters of the re-encoded video data so that the re-encoded video data can be efficiently transferred to and displayed at the requesting remote display device.

The set-top box 110 can also provide security features for the re-encoded video data. In one embodiment, the set-top box 110 can require authentication data prior to reencoding or transmitting the video data to the requesting remote display device. The authentication data can be based on identification information associated with the requesting device (e.g. a device ID number or code), on user-provided authentication information (e.g. a password or personal identification number) or the like. Further, the set-top box 110 can, in the re-encoding process, encrypt the video data to be provided to the requesting remote display device. The encryption can be based upon pre-arranged encryption keys, dynamically created keys, or the like. This encryption reduces the likelihood of unauthorized access to the video data during transmission.

The set-top box 110 transmits the re-encoded video data to the requesting remote display device via the wide area network 115. The remote display device receives the video data, decodes it, and provides the data for display. The data can be displayed in a streaming fashion, or stored for subsequent display.

The set-top box 110 can be configured to provide individual video content items to each of the remote display devices 120 and 122. Accordingly, the set-top box 110 can respond to individual requests from each of the devices, and provide individual content to each device via the wide area network 115. Thus, the remote display devices 120 and 122 can request and display different video content items simultaneously. Further, the video content items displayed at each device can be individually paused, rewound, terminated, or the like.

Figure 2:
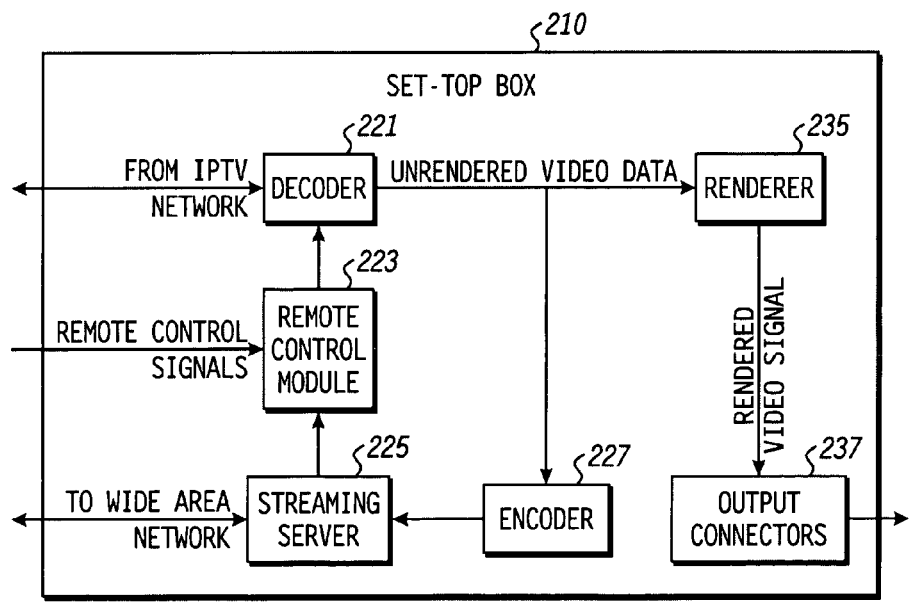
FIG. 2 is a block diagram illustrating a particular embodiment of a set-top box of the communication network of FIG. 1.

FIG. 2 illustrates a block diagram of a particular embodiment of a set-top box 210, corresponding to the set-top box 110 of FIG. 1. The set-top box 210 includes a decoder 221, a remote control module 223, a streaming server 225, an encoder 227, a renderer 235, and output connectors 237. The decoder 221 includes a connection to transmit and receive data from the IPTV network 104, an input to receive control data, and an output to provide unrendered video data. The remote control module 223 includes an input to receive remote control signals, an input to receive internal control signals, and an output to provide control data to the decoder 221.

The streaming server 225 includes a connection to transmit and receive data from the wide area network 115, an output to provide internal control signals to the remote control module 223, and an input to receive encoded video data. The encoder 227 includes an input to receive unrendered video data from the decoder 221, and an output to provide encoded video data to the streaming server 225. The renderer 235 includes an input to receive unrendered video data from the decoder 221 and an output to provide rendered video data. The output connectors 237 include an input to receive the rendered video data from the renderer 235 and an output to provide the rendered video data to the display monitor 130.

The decoder 221 is configured to receive encoded video data from the IPTV network 104 (via the residential gateway 106), decode the video data, and provide unrendered video data at the output. Further, the decoder 221 is configured to receive control data and, based on the control data, request video content items from the television server 102.

The remote control module 223 is configured to receive remote control signals from a user interface device, such as a television remote control, and also to receive internal control signals indicative of requests for video content items from remote display devices. Based on the received control signals, the remote control module 223 provides control data indicative of video content item requests to the decoder 221.

The encoder 227 encodes the unrendered video data and provides the encoded data to the streaming server 225. The set-top box 110 can set various parameters for the encoding process in order to change the encryption, aspect ratio, and other features of the encoded video data. These parameters can be pre-determined or user-programmable.

The streaming server 225 formats the encoded video data received from the encoder 227 for transmission via the wide area network 115. The streaming server 225 can provide additional transmission functions, including buffering, flow control, and other functions, to ensure appropriate transmission of the encoded video data to a requesting remote display device.

The renderer 235 renders the unrendered video data 235 into an appropriate format for display via the display monitor 130. It will be appreciated that although for purposes of discussion the renderer 235 and the encoder 227 are illustrated as connected to a common output of the decoder 221, in other embodiments individual unrendered video data could be provided to each module for independent operation. Accordingly, a first unrendered video content item could be provided to the renderer 235 for rendereing while a second unrendered video content item is simultaneously provided to the encoder 227 for encoding. This allows video content items to be independently displayed at the display monitor 130 and via the remote display devices 120 and 122.

The output connectors 237 provide a physical connection layer for the rendered video data provided by the renderer 235 to be communicated to the display monitor 130. The output connectors 237 can include multiple connectors, and can include S-video, A/V (RCA), DVI, HDMI, composite, or other video connectors.

In operation, the remote control module 223 can receive requests for a video content item from a user interface device and, in response, can provide control data to the decoder 221 indicative of the content item. The decoder 221 requests the video content item from the television server 102 via the IPTV network 104. The decoder 221 receives encoded video data representative of the requested item, and decodes the data to produce unrendered video data. The render 235 renders the unrendered video data and provides rendered video data to the display monitor 130 via the output connectors 237.

In addition, the streaming server 225 can receive requests from a remote display device via the wide area network 115 a request for a video content item. In response, the streaming server 225 provides internal control signals to the remote control module 223, which in turn provides control data to the decoder 221 indicative of the requested video content item. The decoder 221 sends the request to the television server 102, and receives encoded data representative of the requested item. The decoder 221 decodes the data to produce unrendered video data, and the encoder 227 re-encodes the unrendered video data for transmission to the requesting remote display device. The streaming server 225 receives the re-encoded video data and transmits it to the requesting device via the wide area network 115.

Figure 3:
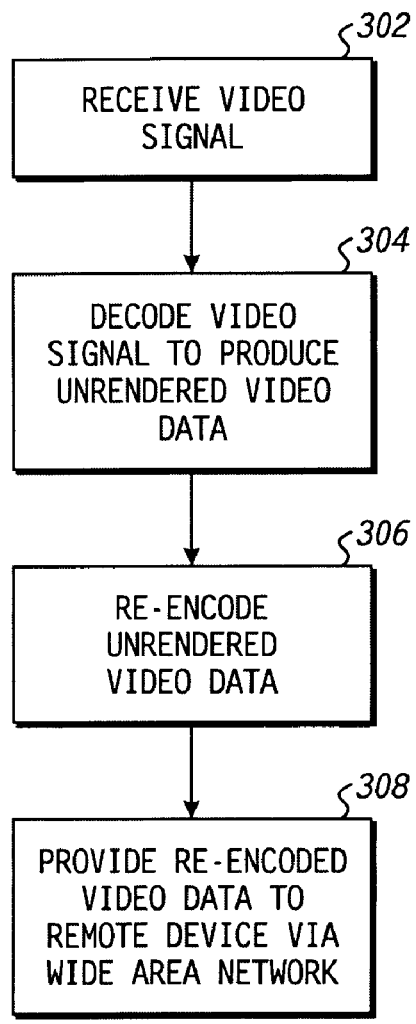
FIG. 3 is a flow diagram of a method of providing video content from a set-top box to a remote device in accordance with one embodiment of the present disclosure.

FIG. 3 illustrates a flow diagram of a particular embodiment of a method of providing video content from a set-top box to a remote display device. At block 302, a video signal is received at a set-top box. The video signal can be a broadcast signal, a multicast signal, and the like. In addition, the video signal can be received from any television content source, including a broadcast, cable, satellite or IPTV content source. At block 304, the set-top box decodes the video signal to produce unrendered video data.

At block 306, the unrendered video data is re-encoded at the set-top box for transmission via a wide area network. In an embodiment, the set-top box can also render the unrendered video data for display at a local display monitor. At block 308, the reencoded video data is communicated to a remote display device via the wide area network.

Figure 4:
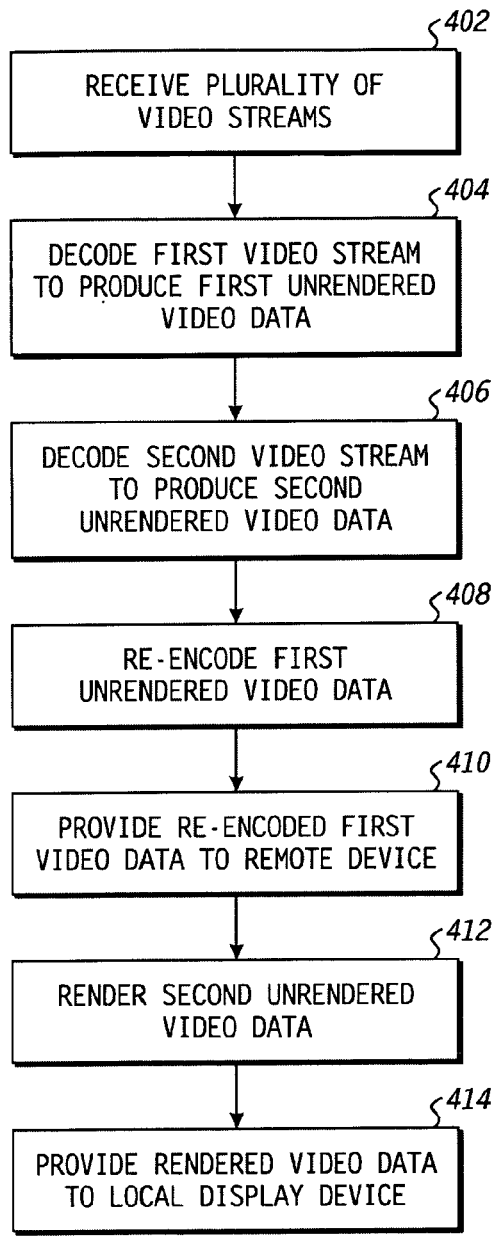
FIG. 4 is a flow diagram of a method of providing video content from a set-top box to a remote device and to a local display device in accordance with one embodiment of the present disclosure.

FIG. 4 illustrates a flow diagram of a particular embodiment of a method of providing video content from a set-top box to remote and local display devices. At block 402, a plurality of video streams is received at a set-top box. At block 404, a first of the plurality of video streams is decoded to produce first unrendered video data. At block 406, a second of the plurality of video streams is decoded to produce second unrendered video data.

At block 408, the first unrendered video data is re-encoded, and at block 410 the re-encoded video data is provided to a remote device via a wide area network. At block 412, the second unrendered video data is rendered, and the rendered video data is displayed at a local display device.

Figure 5:
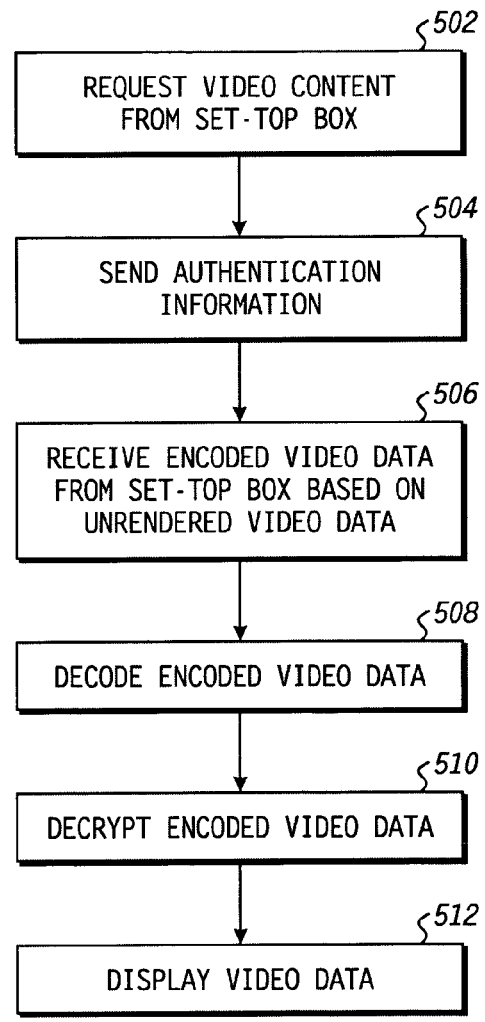
FIG. 5 is a flow diagram of a method of displaying video content from a set-top box at a mobile device in accordance with one embodiment of the present disclosure.

FIG. 5 is flow diagram of a particular embodiment of a method of displaying video data at a mobile device. The mobile device can be a mobile phone, personal data assistant, laptop computer, or the like. At block 502, the mobile device sends a request for video content to a set-top box via a wide area network. At block 504, the mobile device sends authentication information to the set-top box. The authentication information can be send with the request for video content, or via a separate transmission event. The authentication information can be based on user-specified information, such as a password, or on predetermined information, such as device identification information.

At block 506, encoded video data associated with the requested video content is received at the mobile device. The received video data represents the result of an encoding process at the set-top box on unrendered video data. At block 508, the mobile device decodes the encoded video data and, at block 510 decrypts the decoded video data. In an embodiment, decryption can take place prior to decoding of the data. In another embodiment, decryption and decoding can be incorporated into a single process. At block 512, the decoded and decrypted video data is displayed at the mobile device.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method, comprising:
    receiving, by a gateway device comprising a processor, a video packet stream from a remote television server via an internet protocol television network;
    transmitting, by the gateway device, the video packet stream to a set-top box;
    receiving, by the gateway device, a request for selected video content;
    transmitting, by the gateway device, the request for the selected video content to the set-top box;
    receiving, by the gateway device, encoded video data from the set-top box corresponding to the selected video content, wherein the video packet stream is configured for decoding by the set-top box to produce unrendered video data, wherein the unrendered video data is configured for encoding by the set top box to produce the encoded video data, wherein the set-top box renders the unrendered video data to produce rendered video data and transmits the rendered video data to a second display device communicatively coupled to the set-top box; and
    transmitting, by the gateway device, the encoded video data to a display device over a wide area network.

2. The method of claim 1, wherein the rendered video data is associated with video content differing from the selected video content.

3. The method of claim 1, wherein the display device is a display of a cellular phone.

4. The method of claim 1, wherein the display device is a computer device.

5. The method of claim 1, wherein the video packet stream comprises a multicast video stream.

6. The method of claim 1, wherein the video packet stream is received at the gateway device according to an internet protocol signal.

7. The method of claim 1, wherein the set-top box encrypts the unrendered video data.

8. The method of claim 1, wherein the set-top box encodes an aspect ratio into the unrendered video data.

9. The method of claim 1, wherein the set-top box encodes the unrendered video data to change a bit rate of the unrendered video data.

10. The method of claim 1, wherein the set-top box encodes the unrendered video data to change a format of the unrendered video data according to requirements of the display device.

11. A method, comprising:
    transmitting, by a display device comprising a processor, to a set-top box by way of a wide area network a request for selected video content;
    receiving, by the display device, from the set-top box, encoded video data corresponding to the selected video content, wherein the set-top box decodes a video packet stream to produce unrendered video data, and wherein the set top box encodes the unrendered video data to produce the encoded video data, wherein the set-top box receives the video packet stream from a remote television server over an internet protocol television network, renders the unrendered video data to produce rendered video data, and transmits the rendered video data to a second display device communicatively coupled to the set-top; and
    presenting, by the display device, the encoded video data.

12. The method of claim 11, wherein the rendered video data is associated with video content differing from the selected video content.

13. The method of claim 11, wherein the set-top box is encodes an aspect ratio into the unrendered video data according to requirements of the display device.

14. A gateway device, comprising:
    a memory to store executable instructions; and
    a processor coupled to the memory, wherein the processor, responsive to executing the executable instructions, performs operations comprising:
        receiving a video packet stream from a remote television server via an internet protocol television network;
        transmitting the video packet stream to a set-top box;
        receiving a request for selected video content;
        transmitting the request for the selected video content to the set-top box;
        receiving encoded video data from the set-top box and corresponding to the selected video content, wherein the video packet stream is configured for decoding by the set-top box to produce unrendered video data, wherein the unrendered video data is configured for encoding by the set top box to produce the encoded video data, wherein the set-top box renders the unrendered video data to produce rendered video data and transmits the rendered video data to a second display device communicatively coupled to the set-top box; and
        transmitting the encoded video data to a display device over a wide area network.

15. The gateway device of claim 14, wherein the set-top box encodes the unrendered video data to change an aspect ratio of the unrendered video data or a bit rate of the unrendered video data.

16. The gateway device of claim 14, wherein the display device comprises one of a computer device or a display of a cellular phone.

17. The gateway device of claim 14, wherein the set-top box encodes the unrendered video data to change a format of the unrendered video data according to requirements of the display device.

* * * * *